Sept. 10, 1935.  H. C. BABBITT  2,013,945
BRAKE SHIELD
Filed Aug. 24, 1934   2 Sheets-Sheet 1

Inventor
H. C. Babbitt
By Clarence A. O'Brien
Attorney

Sept. 10, 1935.  H. C. BABBITT  2,013,945
BRAKE SHIELD
Filed Aug. 24, 1934     2 Sheets-Sheet 2
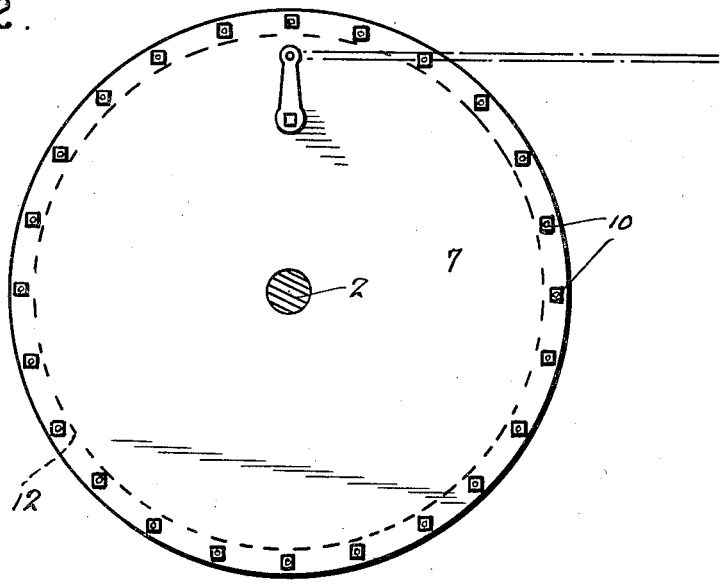
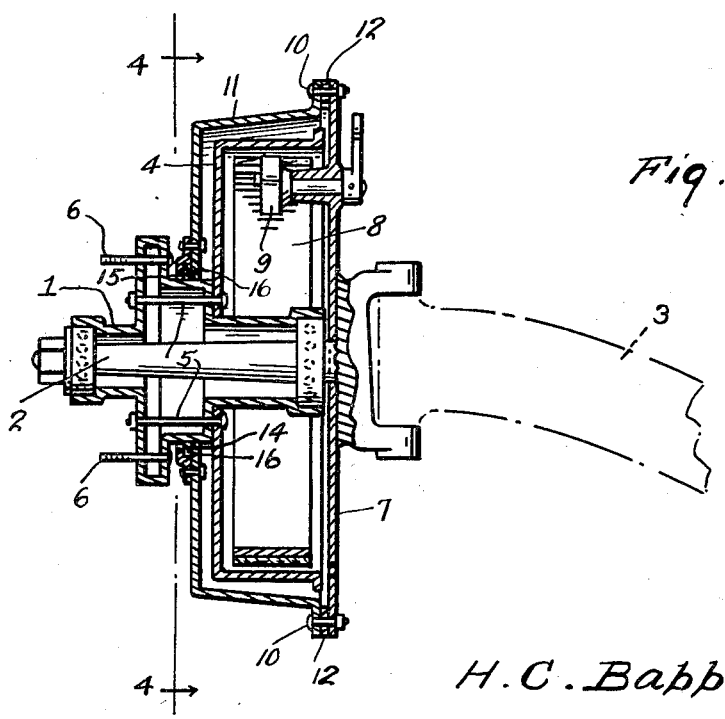
Inventor
H. C. Babbitt
By Clarence A. O'Brien
Attorney Patented Sept. 10, 1935

2,013,945

UNITED STATES PATENT OFFICE 2,013,945

BRAKE SHIELD

Homer C. Babbitt, Sedalia, Mo.

Application August 24, 1934, Serial No. 741,315

1 Claim. (Cl. 188—2)

The present invention relates generally to new and useful improvements in brakes particularly for motor vehicles and has for its primary object to provide, in a manner as hereinafter set forth, novel means for effectively protecting the brake mechanism or elements such as the drum, shoes, etc., from dust, dirt, water and the like.

Other objects of the invention are to provide a brake shield of the aforementioned character which will be simple in construction, strong, durable, highly efficient and reliable in use, compact and which may be manufactured and installed at low cost.

All of the foregoing and still further objects and advantages of the invention will become apparent from the study of the following specification, taken in connection with the accompanying drawings wherein like characters of reference designate corresponding parts throughout the several views, and wherein:

Figure 2 is an elevational view, looking at the inner side of the invention.

Figure 3 is a view in vertical section, taken substantially on the line 3—3 of Figure 1.

Figure 1:
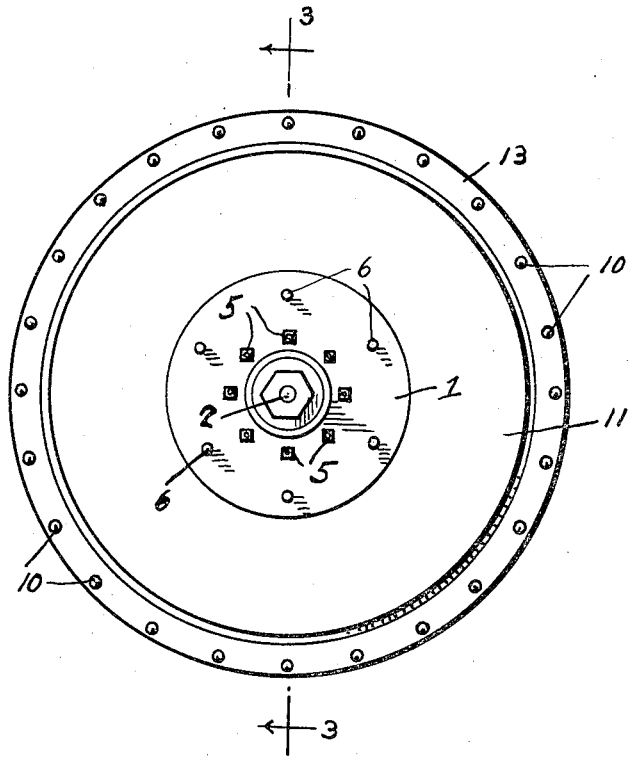
Figure 1 is a view in elevation of the invention, looking at the outer side thereof.
Figure 4:
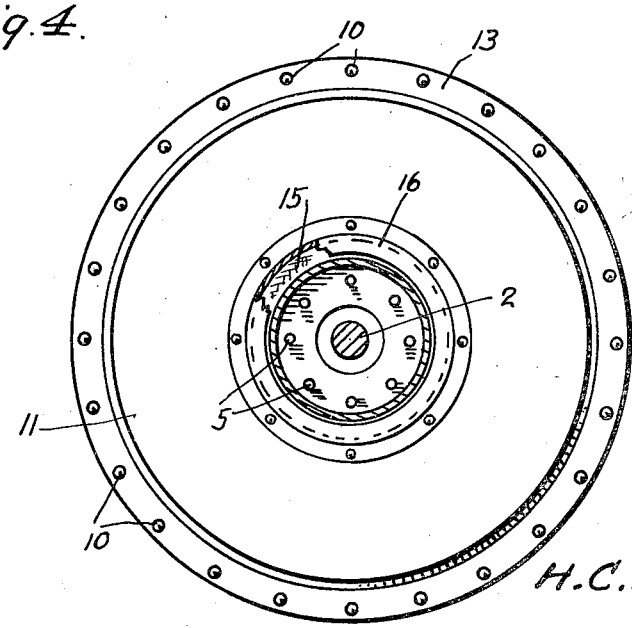
Figure 4 is a vertical sectional view, taken substantially on the line 4—4 of Figure 3.

Referring now to the drawings in detail, it will be seen that the reference numeral 1 designates a front wheel hub which is journalled, as usual, on a spindle 2 which, as usual, swings in a horizontal plane on the front axle 3. The reference numeral 4 designates a drum which is secured to the hub 1 by suitable means, such as bolts 5. The wheel (not shown) is removably secured to the hub 1 by bolts 6.

The reference numeral 7 designates a backing plate which is mounted to swing with the spindle 2. The backing plate 7, as usual, carries the brake elements, such as the shoes 8 and the operating means 9 for said shoes.

The backing plate 7 is of greater diameter than the drum 4 and rigidly secured on the outer peripheral portion thereof, as by bolts 10, is a housing 11 of suitable material, preferably metal, which, in conjunction with said backing plate 7, substantially encloses the drum 4. A gasket 12 is provided between the flange 13 of the housing 11 and the backing plate 7.

The housing 11 closely encircles the hub 1 adjacent the point where the drum 4 is bolted thereto, said housing being provided with an opening 14 which accommodates said drum. To prevent leakage between the housing 11 and the hub 1, a washer 15 of suitable material, preferably felt, is provided. The washer 14 is secured in position by suitable means, such as a retaining ring 16, on the housing 11.

It will thus be seen that means has been provided for effectively shielding the brake drum, shoes, etc. from foreign matter, such as dust, dirt, water, etc. While the drawings show the invention installed on a front wheel brake it will be understood that the shield may be as effectively mounted on the rear brakes of a motor vehicle.

It is believed that the many advantages of a brake shield constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:

The combination with a stationary axle, a spindle mounted for swinging movement on said axle, and a hub journaled on said spindle, of a braking apparatus comprising a drum mounted on the hub, a backing plate fixed on the spindle adjacent the inner end thereof and adjacent the inner side of the hub, said backing plate extending beyond the periphery of said hub, and a housing mounted on the backing plate and, in conjunction with said backing plate, substantially enclosing the drum, said housing encircling the periphery of the drum and extending inwardly adjacent the outer side of said drum, the inwardly extending portion of said housing having an opening therein rotatably accommodating the hub.

HOMER C. BABBITT.